Figure 1:
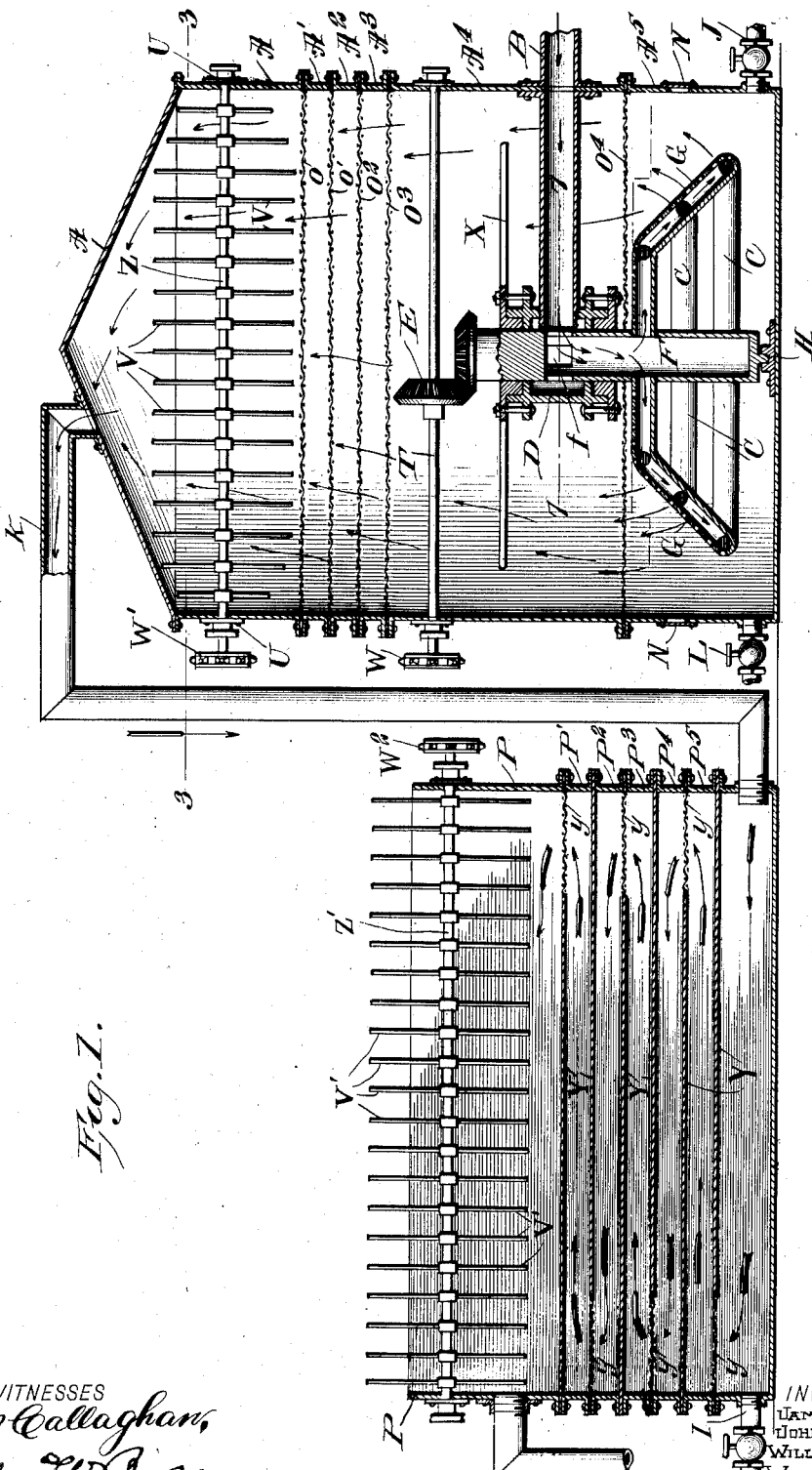

No. 879,023. PATENTED FEB. 11, 1908.
J. T. YATES, J. DEVEY, W. B. RICHAN & W. A. DEVEY.
SMOKE AND FUME CONDENSER.
APPLICATION FILED APR. 26, 1907.

3 SHEETS—SHEET 1.

WITNESSES
E. M. Callaghan
Edw. W. Byrn

INVENTORS
JAMES T. YATES
JOHN DEVEY
WILLIAM B. RICHAN
WALTER A. DEVEY

BY Munn & Co. ATTORNEYS

No. 879,023. PATENTED FEB. 11, 1908.
J. T. YATES, J. DEVEY, W. B. RICHAN & W. A. DEVEY.
SMOKE AND FUME CONDENSER.
APPLICATION FILED APR. 26, 1907.
3 SHEETS—SHEET 2.
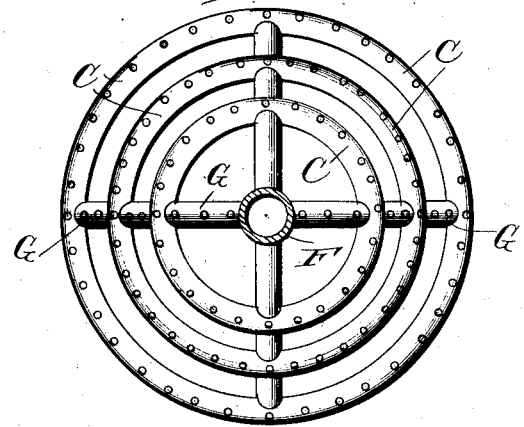
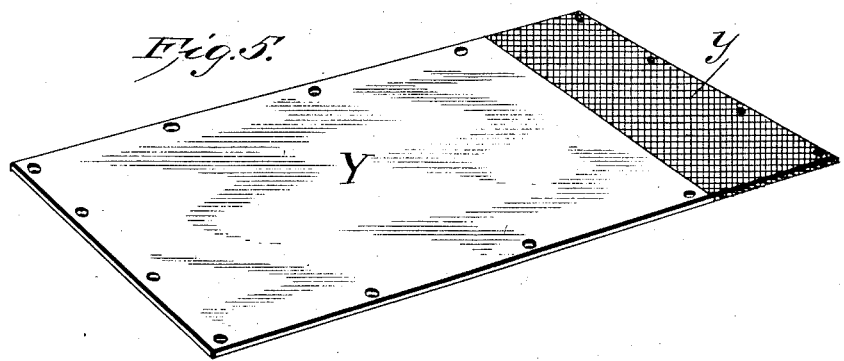
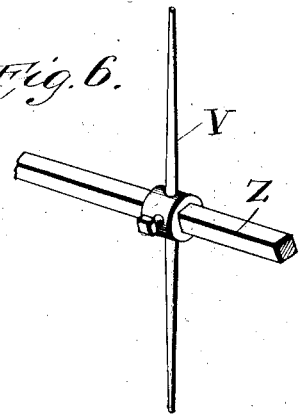
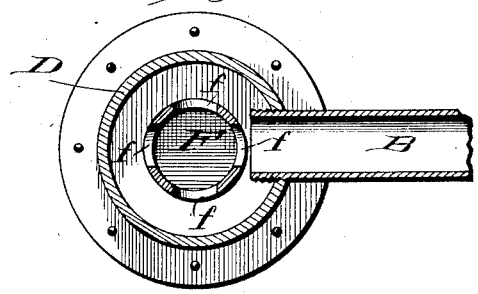
WITNESSES
E. M. Callaghan
Edw. W. Byrn
INVENTORS
JAMES T. YATES
JOHN DEVEY
WILLIAM B. RICHAN
WALTER A. DEVEY
By Munn & Co. ATTORNEYS No. 879,023. PATENTED FEB. 11, 1908.
J. T. YATES, J. DEVEY, W. B. RICHAN & W. A. DEVEY.
SMOKE AND FUME CONDENSER.
APPLICATION FILED APR. 26, 1907.
3 SHEETS—SHEET 3.
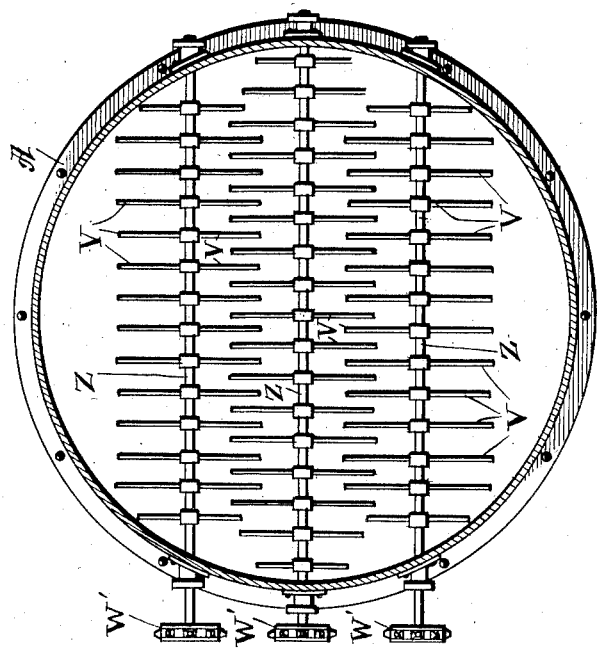
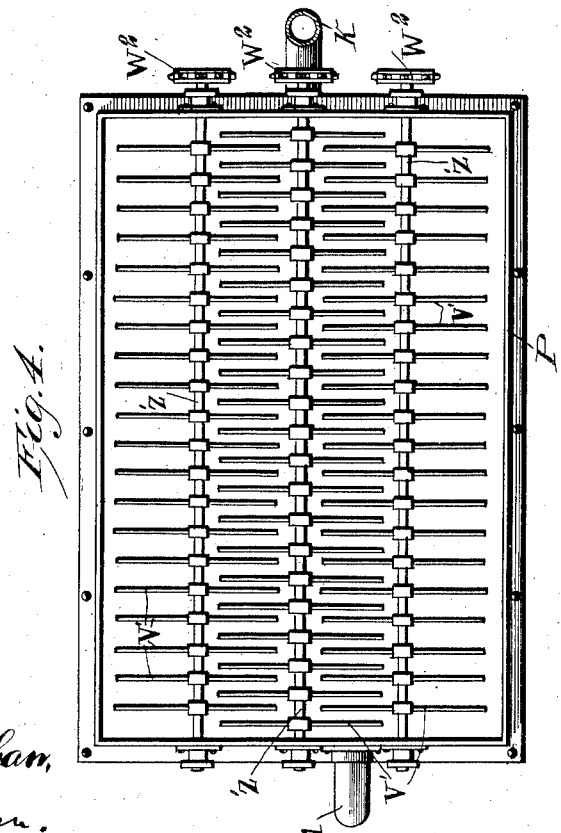
WITNESSES
E. M. Callaghan
Edw. W. Byrn.
INVENTORS
JAMES T. YATES
JOHN DEVEY
WILLIAM B. RICHAN
WALTER A. DEVEY
BY Munn & Co ATTORNEYS

UNITED STATES PATENT OFFICE.

JAMES T. YATES AND JOHN DEVEY, OF LEHI, AND WILLIAM B. RICHAN AND WALTER A. DEVEY, OF AMERICAN FORK, UTAH, ASSIGNORS OF ONE-EIGHTH TO ELISHA H. BOLEY, OF AMERICAN FORK, UTAH.

SMOKE AND FUME CONDENSER.

No. 879,023.　　　Specification of Letters Patent.　　　Patented Feb. 11, 1908.

Application filed April 26, 1907. Serial No. 370,497.

*To all whom it may concern:*

Be it known that we, JAMES T. YATES and JOHN DEVEY, citizens of the United States, and residents of Lehi, in the county of Utah and State of Utah, and WILLIAM B. RICHAN and WALTER A. DEVEY, citizens of the United States, and residents of American Fork, in the county of Utah and State of Utah, have made certain new and useful Improvements in Smoke and Fume Condensers, of which the following is a specification.

Our invention is an improvement in fume arresters and condensers for the purpose of collecting and utilizing the escaping gases from metallurgical furnaces and thereby avoiding injury to vegetation, &c, as well as saving considerable proportions of gold, silver, copper, sulfur, arsenic, and other elements usually carried away and lost in the air. It is also designed to suppress and dispose of the smoke and gases arising from the combustion of coal and other fuel, so as to avoid the nuisance which such escaping smoke involves.

Our invention consists in a novel construction of tanks with means for introducing the gases in minute subdivisions and agitating the same in connection with a supernatant body of water for suppressing and collecting the available material of the smoke and gases as hereinafter fully described with reference to the drawing, in which—

Figure 1 is a sectional elevation of the agitating tank and overflow tank connected together. Fig. 2 is a plan view of the revolving smoke distributing coils. Fig. 3 is a sectional plan view on line 3—3 of Fig. 1. Fig. 4 is a plan view of the overflow tank. Fig. 5 is a detail in perspective of one of the baffle plates of the overflow tank. Fig. 6 is a detail perspective of one pair of the beater arms, and Fig. 7 is an enlarged sectional detail on line 7—7 of Fig. 1.

The usual arrangement of our fume arrester and condenser is shown in the sectional view of Fig. 1, and comprises two principal elements, the one an elevated scrubber tank closed at both top and bottom, as shown at A on the right hand side, and the other an overflow settling tank P, shown on the left hand side of Fig. 1, the two being connected by a pipe K emerging from the top of tank A and delivering into the bottom of tank P. The scrubber tank A is preferably of cylindrical form and made of sheet metal, or any other desired material, and is composed of a series of superposed sections detachably united. These sections consist of the upper section A, the three shorter sections $A'$, $A^2$, $A^3$, and two subjacent sections $A^4$, $A^5$, of larger size. These sections are formed at their meeting edges with right angular flanges connected together by bolts and there is secured between them at these points of union, reticulated screens O, $O'$, $O^2$, $O^3$, $O^4$. Between the reticulated screens $O^3$, $O^4$, an inlet pipe B enters the side wall of the section $A^4$, and being suitably clamped thereto by flanges and bolts, extends to the middle of the tank, where it communicates with a central boxing D, having packed stuffing-box glands at the top and bottom. This boxing B is stayed in position by one or more cross braces X.

Centrally through the boxing D there passes a vertical hollow shaft F, whose lower end is pivoted upon a step bearing H, in the bottom of the tank. The upper end of this hollow shaft is connected to and rotated by a transverse shaft T through the medium of the bevel gears E, the said shaft T deriving motion from a sprocket wheel W outside of the tank, which is suitably driven by a chain. The driving shaft T is connected to the side walls of the tank by suitable stuffing boxes forming water-tight bearings.

To the lower part of the hollow vertical shaft F is attached the rotary distributing coil C whose three circular sections C, C, C, are in open communication with and connected by the pipes G, G, which extend radially to and communicate with the interior of the hollow shaft F, as seen in Fig. 2.

The circular coil C and pipes G are perforated with numerous small holes, as seen in Fig. 2, and the upper end of the hollow shaft F is provided with openings *f* communicating with the interior of the boxing D and the inlet pipe B.

In the upper part of the tank A is journaled a horizontal shaft Z turning in water-tight bearings and provided with radial beater arms V, and having outside of the tank a sprocket wheel $W'$, to which rotary motion is imparted by a chain.

J is an inlet for water controlled by a suitable valve and L is a washout outlet also controlled by a valve. N are handholds in the side of the tank for giving access to the interior.

The overflow tank is composed of a series of superposed sections P, P', P², P³, P⁴, P⁵, which are connected together by flanged edges by means of bolts and between which flanged edges are secured the margins of a series of baffle plates Y, each of which has at one end a perforated or reticulated section y, as seen in Fig. 5. The reticulated sections y of these baffle plates are arranged in the overflow tank alternately at opposite ends as seen in Fig. 1, so that the gases or products of combustion are given a tortuous path in rising through said baffle plates as indicated by the arrows.

In the top of the overflow tank are journaled a series of rotary shafts Z' driven by sprocket wheels W² and having attached to them beater arms V'.

I is an outlet pipe provided with a suitable valve and connecting with the bottom of the overflow tank and M is a down-turned overflow pipe.

The operation of our fume condenser is as follows. Water is admitted to the first tank through the inlet valve J until it completely fills said tank and passes over into the overflow tank through pipe K and fills said overflow tank to the level of the overflow pipe M. The gases from the furnace stack are then turned into the pipe B and by a suitable blower or other forcing apparatus are made to forcibly enter the hollow shaft F and to issue through the distributing coils in the form of minute jets into the water below the reticulated screen O⁴ and rising successively through the upper screens O³, O², O', O. This gives intimate contact between the gases and the water for condensing and throwing down any solid constituents of the gases and all soluble vapors. As the hollow shaft F revolves the distributing coils constantly deliver their jets into new bodies of water and the revolving beaters V in the top of the tank, by their continued agitation, thrash about the fumes and promote an intimate contact of the fumes and the further precipitation of their solid constituents.

As the gases pass over through the pipe K they enter the bottom of the overflow tank and pass through the water therein in zigzag fashion as indicated by the arrows, and receive, before escaping at the overflow, a final thrashing from the beaters V'.

By the above mentioned operations a most intimate contact between the fumes or gases and the water is secured, so as to deliver the gases into the air in an innocuous condition and save in the bottom of the tanks any valuable mineral constituents which may have passed out from the furnace stack.

If desired one or more of the screens O can be covered with filter cloth or any other kind of filter material.

We claim—

1. An arrester and condenser for fumes, smoke and gases, comprising a tank having in the center thereof a rotary perforated distributing coil and means for rotating it and a gas pipe leading thereto.

2. An arrester and condenser for fumes, smoke and gases, comprising a tank having in the center thereof a rotary perforated distributing coil, a gas pipe leading thereto and means for rotating the coil, and one or more superposed reticulated screens.

3. An arrester and condenser for fumes, smoke and gases, comprising a tank having in the center thereof a rotary perforated distributing coil, means for rotating it, a gas pipe leading thereto, one or more superposed reticulated screens and one or more revolving beaters.

4. An arrester and condenser for fumes, smoke and gases, comprising a tank made in horizontal sections having marginal flanges bolted together, screens clamped between said sections and a revolving gas distributer in the bottom of the tank.

5. An arrester and condenser for fumes, smoke and gases, consisting of a tank, a transverse driving shaft with bevel gear, a hollow central shaft connected to and driven by the bevel gear and having one or more inlet openings, a stationary closed boxing surrounding the hollow shaft about its openings, an inlet gas pipe extending to this boxing and a perforated distributing coil connected to the hollow shaft.

6. In an arrester and condenser for fumes, smoke and gases, the overflow and settling tank comprising a series of superposed sections having flanged margins connected by bolts and having clamped between these margins baffle plates with reticulated ends, said reticulated ends being arranged alternately at opposite sides of the tank.

JAMES T. YATES.
JOHN DEVEY.
WILLIAM B. RICHAN.
WALTER A. DEVEY.

Witnesses:
NORMAN A. WING,
E. H. BOLEY.